United States Patent
Klaiber et al.

(10) Patent No.: US 7,620,779 B1
(45) Date of Patent: Nov. 17, 2009

(54) SYSTEM AND METHOD FOR HANDLING DIRECT MEMORY ACCESSES

(76) Inventors: Alexander C. Klaiber, 231 Sierra Vista Ave., Mountain View, CA (US) 94043; Guillermo J. Rozas, 104 Magneson Terrace, Los Gatos, CA (US) 95032; David A. Dunn, 4525 191st Pl., NE., Sammamish, WA (US) 98074

( * ) Notice: Subject to any disclaimer, the term of this patent is extended or adjusted under 35 U.S.C. 154(b) by 212 days.

(21) Appl. No.: 11/439,361

(22) Filed: May 22, 2006

Related U.S. Application Data

(62) Division of application No. 10/411,168, filed on Apr. 9, 2003.

(51) Int. Cl.
*G06F 12/00* (2006.01)
(52) U.S. Cl. .................................................... 711/144
(58) Field of Classification Search ................ 711/144, 711/165, 170
See application file for complete search history.

(56) References Cited

U.S. PATENT DOCUMENTS

| | | |
|---|---|---|
| 5,345,576 A | 9/1994 | Lee et al. |
| 5,623,633 A | 4/1997 | Zeller et al. |
| 5,644,753 A | 7/1997 | Ebrahim et al. |
| 5,704,058 A | 12/1997 | Derrick et al. |
| 5,761,468 A | 6/1998 | Emberson |
| 5,860,111 A | 1/1999 | Martinez et al. |
| 5,897,656 A | 4/1999 | Vogt et al. |
| 5,953,538 A | 9/1999 | Duncan et al. |
| 6,088,769 A | 7/2000 | Luick et al. |
| 6,122,714 A | 9/2000 | VanDoren et al. |
| 6,128,701 A | 10/2000 | Saulsbury et al. |
| 6,128,702 A | 10/2000 | Saulsbury et al. |
| 6,205,517 B1 | 3/2001 | Sugaya |
| 6,219,745 B1 | 4/2001 | Strongin et al. |
| 6,345,320 B1 | 2/2002 | Kawamata et al. |
| 6,438,653 B1 | 8/2002 | Akashi et al. |
| 6,535,960 B1 | 3/2003 | Nishida et al. |
| 6,546,464 B2 | 4/2003 | Fortuna et al. |
| 6,633,958 B1 | 10/2003 | Passint et al. |
| 6,638,653 B2 | 10/2003 | Andou et al. |
| 6,662,277 B2 | 12/2003 | Gaither |
| 6,668,287 B1 | 12/2003 | Boyle et al. |

(Continued)

OTHER PUBLICATIONS

Agarwal et al., "The MIT Alewife Machine", Mar. 1999, Proceedings of the IEEE, vol. 87, No. 3, pp. 430-444.

(Continued)

*Primary Examiner*—Hiep T Nguyen

(57) ABSTRACT

Methods and systems for efficiently processing direct memory access requests coherently. An external agent requests data from the memory system of a computer system at a target address. A snoop cache determines if the target address is within an address range known to be safe for external access. If the snoop cache determines that the target address is safe, it signals the external agent to proceed with the direct memory access. If the snoop cache does not determine if the target address is safe, then the snoop cache forwards the request on to the processor. After the processor resolves any coherency problems between itself and the memory system, the processor signals the external agent to proceed with the direct memory access. The snoop cache can determine safe address ranges from such processor activity. The snoop cache invalidates its safe address ranges by observing traffic between the processor and the memory system.

25 Claims, 8 Drawing Sheets

U.S. PATENT DOCUMENTS

| | | |
|---|---|---|
| 6,785,780 B1 | 8/2004 | Klein et al. |
| 6,868,481 B1 | 3/2005 | Gaither et al. |
| 6,925,536 B2 | 8/2005 | Glasco et al. |
| 2003/0005237 A1 | 1/2003 | Dhong et al. |
| 2003/0131202 A1 | 7/2003 | Khare et al. |
| 2003/0163745 A1 | 8/2003 | Kardach |

OTHER PUBLICATIONS

Handy, Jim, "The Cache Memory Books", 1998, Academic Press, $2^{nd}$ edition, pp. 155-169.

Jouppi, Norman P., "Improving Direct-Mapped Cache Performance by the Addition of a Small Full-Associative Cache and Prefetch Buffers", Proceedings of the $17^{th}$ Annual International Symposium on Computer Architecture, pp. 364-373.

CPU Cache, From Wikipedia, the free encyclopedia. Http://wikipedia.org/wik/CPU. 18 Pages. Dec. 2007.

Agarwal et al., "The MIT Alewife Machine", Mar. 1999, Proceedings of the IEEE, vol. 87, No. 3, pp. 430-444.

Handy, Jim, "The Cache Memory Books", 1998, Academic Press, $2^{nd}$ edition, pp. 155-169.

Jouppi, Norman P., "Improving Direct-Mapped Cache Performance by the Addition of a Small Full-Associative Cache and Prefetch Buffers", Proceedings of the 17th Annual International Symposium on Computer Architecture, pp. 364-373 [Jun. 1990].

Anant Agarwal' et al. "The MIT Alewife Machine" Laboratory for Computer Science, Massachusetts Institute of Technology Cambridge, Massachusetts 02139. Mar. 1999.

Non Final Office Action; Mail Date Jul. 27, 2006; U.S. Appl. No. 10/411,168.

Non Final Office Action; Mail Date Sep. 20, 2005; U.S. Appl. No. 10/411,168.

Non Final Office Action; Mail Date Nov. 1, 2007; U.S. Appl. No. 10/411,168.

Notice of Allowance, Mail Date Mar. 19, 2009; U.S. Appl. No. 10/411,168.

Notice of Allowance, Mail Date Apr. 12, 2007; U.S. Appl. No. 10/411,168.

Notice of Allowance, Mail Date May 23, 2008; U.S. Appl. No. 10/411,168.

Notice of Allowance, Mail Date Oct. 30, 2008; U.S. Appl. No. 10/411,168.

Restriction Requirement, Mail Date Mar. 28, 2006; U.S. Appl. No. 101411,168.

Final Office Action, Mail Date Feb. 25, 2009; U.S. Appl. No. 11/102,289.

Final Office Action, Mail Date Sep. 28, 2007; U.S. Appl. No. 11/102,289.

Non Final Office Action, Mail Date Mar. 23, 2007; U.S. Appl. No. 11/102,289.

Non Final Office Action, Mail Date May 12, 2009; U.S. Appl. No. 11/102,289.

Non Final Office Action, Mail Date Jun. 12, 2008; U.S. Appl. No. 11/102,289.

Final Office Action, Mail Date Mar. 16, 2009; U.S. Appl. No. 11/102,171.

Final Office Action, Mail Date Nov. 26, 2007; U.S. Appl. No. 11/102,171.

Non Final Office Action, Mail Date Mar. 26, 2007; U.S. Appl. No. 11/102,171.

Non Final Office Action, Mail Date Jul. 9, 2008; U.S. Appl. No. 11/102,171.

SYSTEM AND METHOD FOR HANDLING DIRECT MEMORY ACCESSES

RELATED U.S. PATENT APPLICATION

This Divisional application claims the benefit of the co-pending, commonly-owned U.S. patent application Ser. No. 10/411,168, filed on Apr. 9, 2003, by Klaiber et al., and titled "A System And Method For Handling Direct Memory Accesses," which is incorporated herein by reference.

TECHNICAL FIELD

Embodiments of the present invention relate to the field of computer architecture. More specifically, embodiments of the present invention relate to the field of maintaining coherency between a memory system and a processor while supporting direct memory access.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be apparent, however, to one skilled in the art, upon reading this disclosure, that the present invention may be practiced without these specific details. In other instances, well-known structures and devices are not described in detail in order to avoid obscuring aspects of the present invention.

Figure 1:
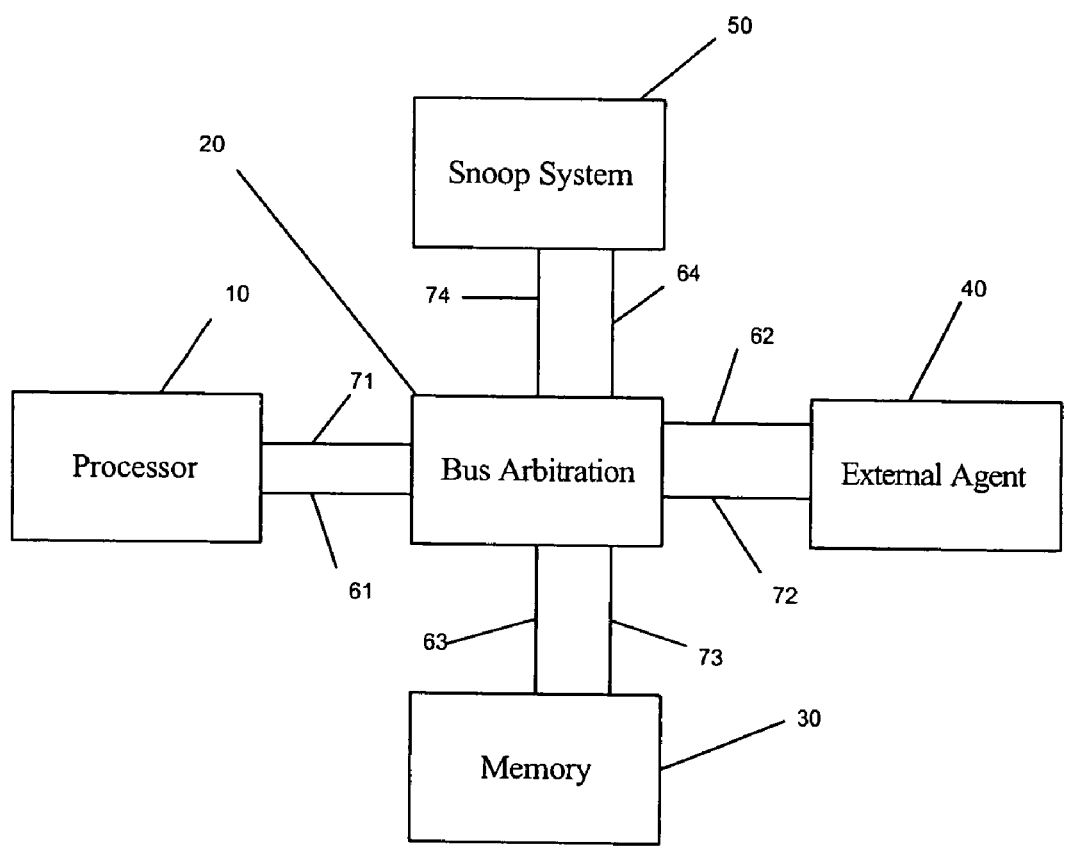
FIG. 1 is a block diagram of a computer system comprising an embodiment of the present invention.

FIG. 1 shows a block diagram of an exemplary embodiment of the present invention. A processor 10 issues an address on address bus 61. Bus arbitration unit 20 routes that address to the memory system 30 on address bus 63. The memory system provides the data at the indicated address on data bus 73 that is in turn connected to data bus 71. Alternatively, the processor 10 can also send data to the memory system on data bus 71 and data bus 73. Similarly, an external agent 40 can access the data in the memory system 30 through address bus 62 and data bus 72.

The processor 10 manipulates data in accordance with a computer program also stored in memory. For efficient operation, the processor 10 caches data and programs locally. To support caching, data is transferred in blocks between the processor 10 and the memory system 30 from time to time. This introduces the potential for coherency problems because the cached data corresponding to a particular address may be changed from the data stored in the memory system 30 at that address. An important part of the correct operation of the entire computer system is maintaining coherency between the cached data in the processor 10 and the corresponding data in the memory system 30.

Figure 2:
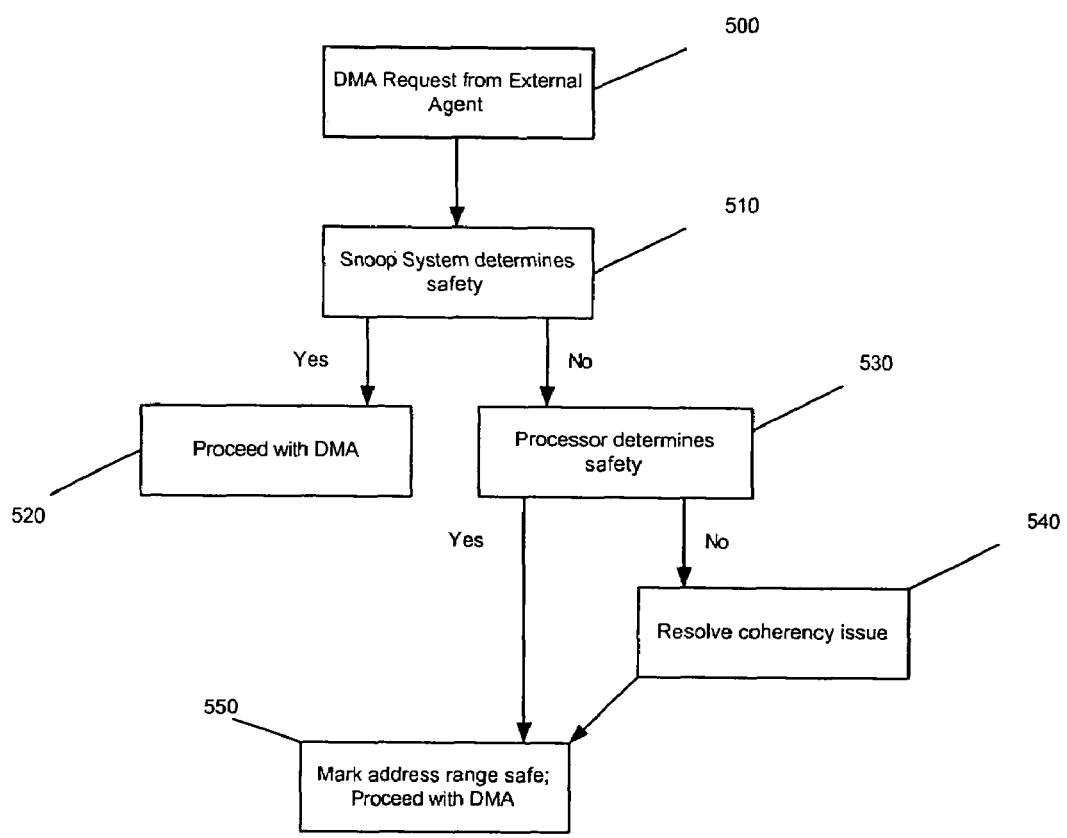
FIG. 2 is a flow diagram of illustrating tile use of an embodiment of a snoop system to check the safety of a DMA request in accordance with the present invention.

The snoop system 50, in accordance with an embodiment of the present invention, observes traffic among the other units and maintains information about various address ranges that are safe in a safe address range store. A "safe" address range is one where the data corresponding to that address range in the memory system 30 is also cached in the processor 10. In contrast, an "unsafe" address range is one where some data corresponding to that address range is within the processor. The computer system of FIG. 1 processes an external direct memory access (DMA) request as shown in the flow diagram of FIG. 2. In step 500, the external agent 40 makes a DMA request by signaling the bus arbitration unit 20. The DMA request specifies at least a target address and whether the request was a read or a write.

In step 510, the snoop system 50 determines if the target address is safe. If the snoop system 50 makes that determination, then the DMA request is handled directly by the memory system 30 and the bus arbitration unit 20 in step 520. If the snoop system 50 does not determine that the DMA request is safe, then the DMA request is passed on to the processor 10.

The processor 10 determines if the DMA request is unsafe by examining its own caches, store buffers and other supporting data structures in step 530. If the processor 10 determines that the DMA request is safe, the processor 10 provides a safe signal to the external agent 40 to proceed with the DMA request in step 550. In addition, the snoop system 50 observes the safe signal and internally marks the address range containing the DMA request as safe. In an alternate embodiment, the processor 10 provides a safe signal to the snoop system 50 that in turn relays the signal to the external agent 40. In an alternate embodiment, the external agent 40 relays the safe signal to the snoop system 50.

If step 530 reveals that the DMA request is unsafe, then the processor 10, through appropriate techniques such as cache control instructions, moves appropriate data into the memory system 30 if required and marks the processor's own copy of data invalid as appropriate in step 540. This renders the memory system 30 and the processor 10 coherent, thus making it safe to process the DMA request. The processor 10 then provides a safe signal to the external agent 40 to proceed with the DMA request and to the snoop system 50 to mark the address range as safe as described in step 550.

Figure 3:
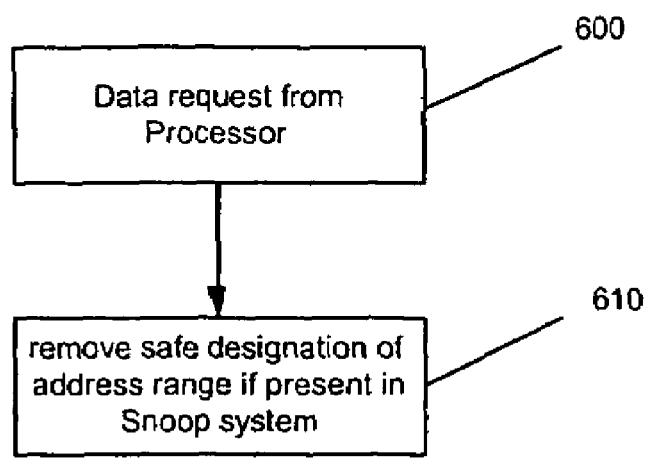
FIG. 3 is a flow diagram illustrating the use of an embodiment of a snoop system to remove an address range from a snoop system in accordance with the present invention.

In one embodiment, the snoop system 50 begins operation with no safe address ranges stored. The snoop system 50 adds a safe address range containing the target address of a DMA request upon receipt of a safe signal from processor 10 corresponding to that DMA request as described in step 550 of FIG. 2. FIG. 3 shows the steps for removing a safe address range from the snoop system 50. In step 600, the processor 10 initiates a transaction to the memory system 30. In step 610, the snoop system 50 removes a safe address range from its collection if data corresponding to an address in that address range moves between the processor 10 and the memory system 30. The snoop system 50 may also remove a safe address range if it runs out of storage capacity. In an alternate embodiment, the processor 10 can programmatically add safe address ranges to the snoop system 50. In an alternate embodiment, the processor 10 generates a safe signal when data was leaving the processor 10 and processor 10 had no cached copies of the data.

In one embodiment, a safe address range comprises a base address and block size. A target address that is greater than or equal to the base address and less than the base address plus the block size is determined to be safe. In another embodiment, the block size is of size $2^G$ and the least significant G bits of the base address are 0. This type of safe address range will be referred to as an aligned range of granularity G.

In one embodiment, the snoop system 50 also contains information to indicate that an address range was safe for reading only or safe for both reading and writing. If read-only data was moving into the processor 10 from an address in a safe range, then the snoop system 50 marks that safe range as safe for reading only. This permits the snoop system 50 to authorize an external agent 40 to read from that safe range, but pass on the request to write to that safe range to the processor 10.

In an alternate embodiment, upon a first reference to an address in a safe range by the processor 10, the snoop system 50 marks the address as unsafe for both reading and writing. Upon a request by the external agent 40 to that address, the snoop system 50 passes on the request to the processor 10. The processor 10 determines that the data corresponding to that safe range is suitable for read-only access and signals the snoop system 50 with that information. The snoop system 50 marks the safe range as safe only for reading.

In one embodiment, there are multiple processors and the snoop system 50 stores additional information to relating the safety of the address range to each processor. In one embodiment, there are multiple external agents. In alternate embodiments, processor 10 may have one or more levels each of data and instruction caches. Processor 10 may also buffer memory accesses internally.

Figure 4:
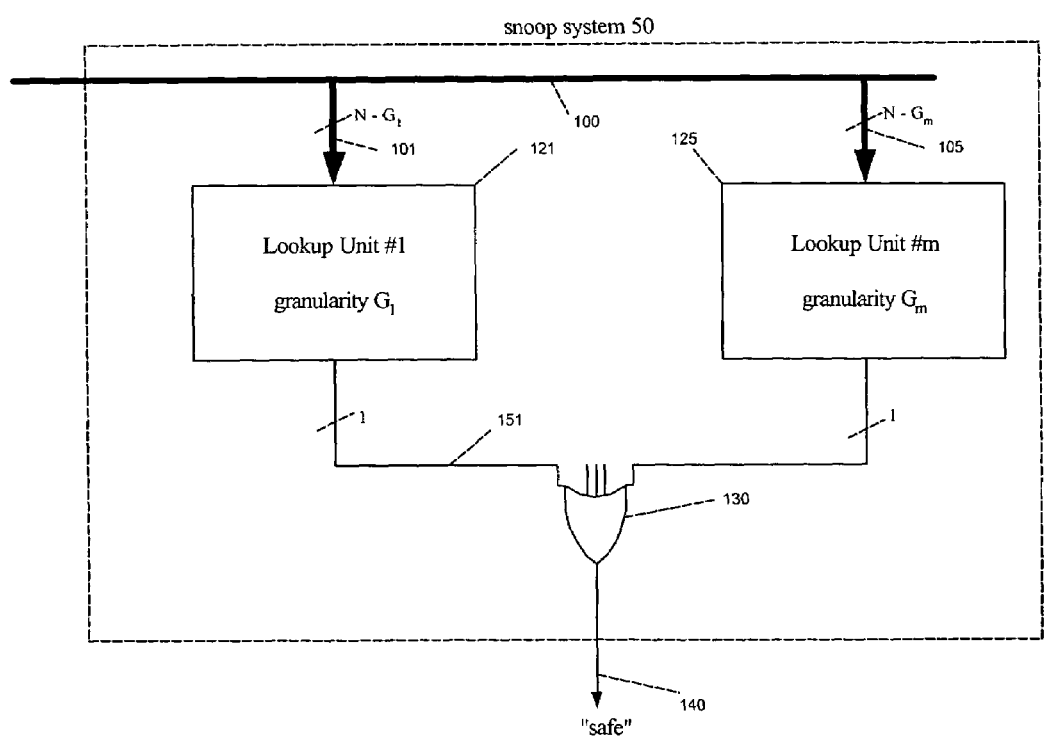
FIG. 4 is a block diagram of an embodiment of a snoop system with multiple look-up units in accordance with the present invention.

FIG. 4 shows an exemplary implementation of a snoop system 50 with multiple look-up units 121, 125 in accordance with one embodiment of the present invention. A snoop system 50 may have one, two or more look-up units 121, 125. A particular look-up unit 121 evaluates the safety of a target address on input bus 101 for a particular block size. In the implementation shown, each look-up unit may support an aligned range with a particular granularity $G_i$. Thus, the look-up input 101 need only use the high order $N-G_i$ bits of the input bus 101, where N is the number of bits in the input bus 101.

A look-up unit 121 generates a look-up output 151 having value of one if that look-up unit determines that the target address is within a safe address range stored within that look-up unit and produces a zero otherwise. OR gate 130 combines the results from all look-up units to produce a final result 140 for the system. Note that in one embodiment if all of the results from each lookup unit 121 are zero, it does not necessarily follow that the target address is unsafe. Rather, the zero result implies that the target address is not known to be safe and that further evaluation by processor 10 is required.

A cache is a system that takes an input and determines if that input matches a key already stored in the system. If so, the system produces an output indicating a hit. If the input does not match, then the system indicates a miss. In one embodiment, a cache can also contain a data entry corresponding to each stored key. If the there is a hit, then the cache also provides the value in the entry corresponding to the key that resulted in the hit. A cache could be implemented in numerous equivalent ways, such as direct-mapped, set associative, or fully associative cache, or as a combination of content addressable memories and RAMs or as a combination of memory hardware and software.

In one embodiment, a look-up unit 121 of FIG. 4 supporting an N bit target address with an aligned range with granularity G may be implemented as a cache that can compare keys and inputs of N–G bits with no entries. The signal indicating a hit or miss may be the look-up unit output 151.

Figure 5:
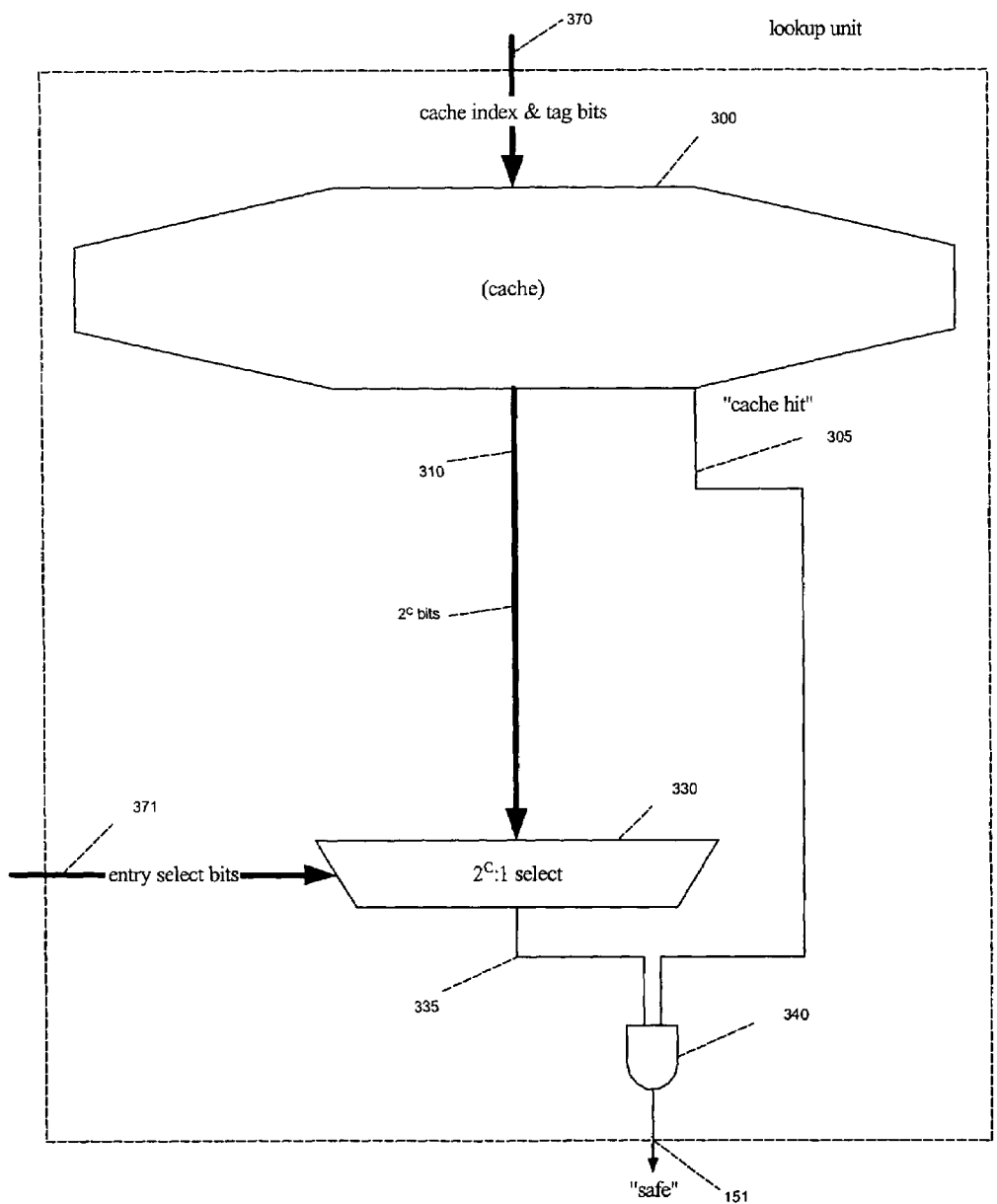
FIG. 5 is a block diagram of an embodiment of a look-up unit using an expanded cache entry in accordance with the present invention.
Figure 6:
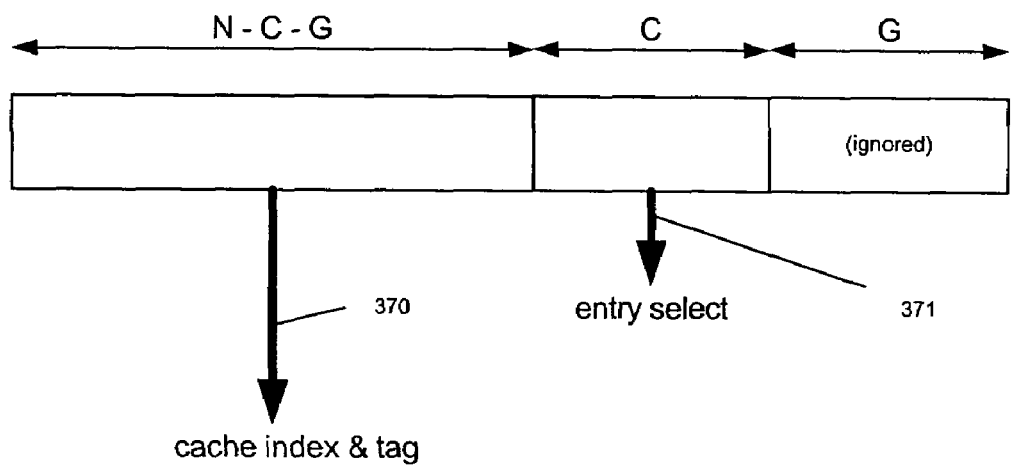
FIG. 6 shows the usage of N bits of a target address for the embodiment of the look-up unit in FIG. 5.

FIG. 5 shows an additional embodiment of a look-up unit 121 implementing an aligned range of granularity G that will process an N bit address. In this embodiment, each entry of the cache 300 has $2^C$ bits to support clustering level C. Each bit stores the safety state of one of $2^C$ contiguous blocks, with each block having $2^G$ bytes in it. FIG. 6 shows the break down of an N bit address. The high order N–C–G bits are used as the cache index input 370. Then next C bits are used as an entry select input 371. The cache 300 responds to the cache index input 370 by producing an entry output 310 with $2^C$ bits and a cache hit signal 305. The cache hit signal 305 indicates that the entry output 310 is valid. The entry bit selector 330 uses the entry select input 371 to pick one of the $2^C$ bits in the entry output 371 as the chosen entry safety bit 335. AND gate 340 computes the look-up output 151 as the logical "and" of the cache hit signal 306 and the chosen entry safety bit 335.

Figure 7:
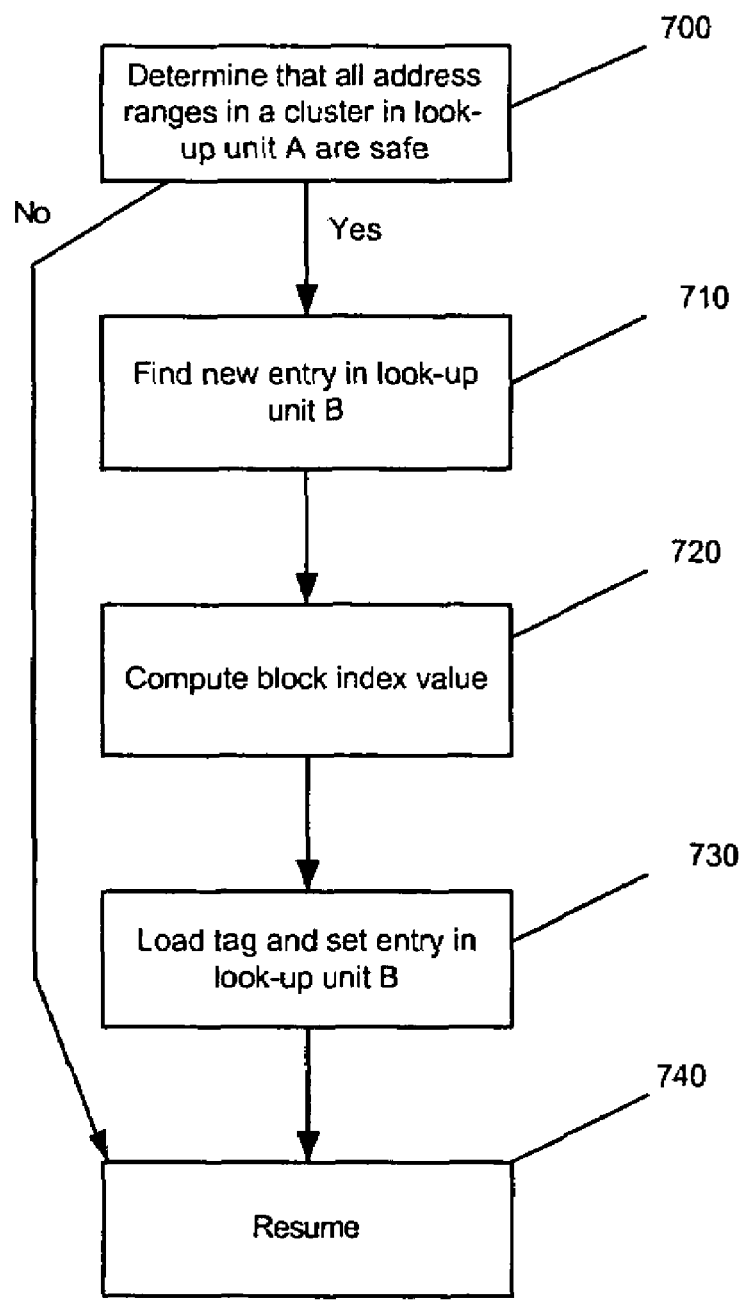
FIG. 7 is a flow diagram illustrating the use of an embodiment of a snoop system to upgrade an entry in accordance with the present invention.
Figure 8A:
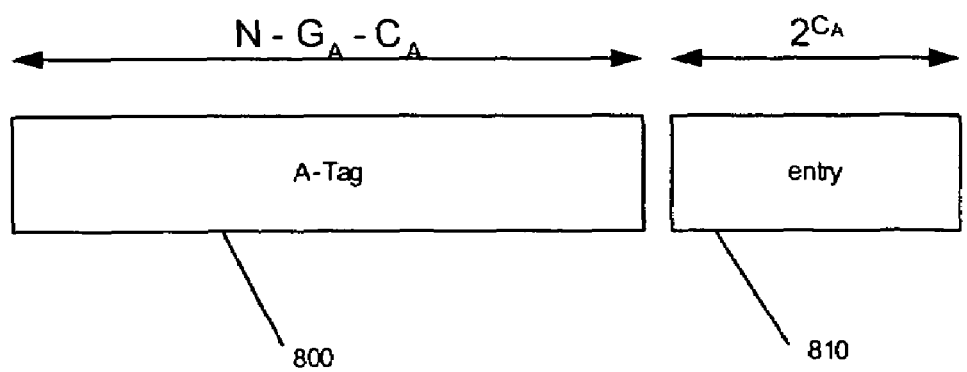
FIGS. 8A and 8B are a block diagram illustrating the structure of tags and entries for a snoop system upgrading an entry using the embodiment of the method shown in FIG. 7.
Figure 8B:
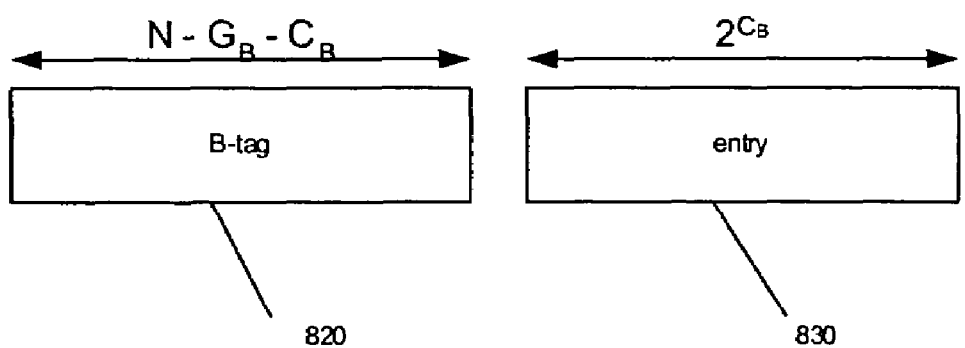

FIG. 7 shows a flow diagram for the process of upgrading an entry in an embodiment supporting an N bit address with (i) a first look-up unit (look-up unit "A") supporting an aligned range with granularity $G_A$ and clustering level $C_A$, and (ii) a second look-up unit (look-up unit "B") supporting an aligned range with granularity $G_B$ and clustering level $C_B$ with the relationship that $G_A+C_A=k+G_B$ for a non-negative integer k and $C_B \geq k$. (In one embodiment, the arrangement of units A and B would be similar to that shown in FIG. 4.) FIG. 8A shows the arrangement of bits for an entry in a cache in look-up unit A. The A-tag 800 has $N-G_A-C_A$ bits while A-entry 810 has $2^{C_A}$ bits. FIG. 8B shows the arrangement of bits for an entry in a cache in look-up unit B. The B-tag 820 has $N-G_B-C_B$ bits while B-entry 830 has $2^{C_B}$ bits. The A-tag 800 and the B-tag 820 store the tag and indices necessary to operate their respective caches.

In step 700, the snoop system 50 determines if all bits in A-entry 810 are set to a safe state. If so, then in step 710, the snoop system 50 creates a new entry in a cache in look-up unit B. The B-tag 820 for the new entry would be the top $N-G_B-C_B$ bits of A-tag 800. In step 720, compute the block index value as the remaining bits of A-tag 800. In step 730, the B-entry 830 would be set to the not safe state except for a block of $2^k$ bits that would be set to indicate a safe state. For an implementation where the bits of the block are indexed from a least significant bit index of 0 to a most significant bit index of $2^{C_B}-1$, the least significant bit of the block would be 2 raised to the block index value. In step 740, the snoop system 50 resumes normal operation.

In one embodiment, the method aborts at step 710 if there are no free entries in the cache of look-up unit B. In an alternate embodiment, the A-tag 800 and A-entry 810 are removed from look-up unit A. It should also be appreciated that one can reorder the bits of the block in other equivalent ways.

In an alternate embodiment, there are more than two look-up units supporting the process of upgrading an entry each having different granularities.

It should also be appreciated that the each embodiment may also be implemented in other equivalent manners without departing from the scope and spirit of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and theft equivalents.

What is claimed is:

1. A method of upgrading an entry in a cache comprising a first look-up unit and a second look-up unit, said method comprising:
    determining whether entries of said first look-up unit are safe, wherein said entries comprise high order bits corresponding to a number of bits of an address less a first clustering level less a first granularity, and wherein said entries comprise low order bits corresponding to said first clustering level;
    provided entries of said first look-up unit are safe, creating a new entry in said second look-up unit, wherein said new entry comprises entries with high order bits corresponding to the number of bits of said address less a second clustering level less a second granularity, and wherein said new entry comprises entries with low order bits corresponding to said second clustering level; and
    setting entries of a block within said second look-up unit safe, wherein said block comprises high order bits corresponding to said first granularity and said first clustering level less said second granularity.

2. The method as described in claim 1 further comprising:
removing said entries of said first look-up unit.

3. The method as described in claim 1 further comprising:
determining whether said second look-up unit contains free entries.

4. The method as described in claim 1 further comprising:
terminating said creating and terminating said setting when said second look-up unit contains no free entries.

5. The method as described in claim 1 further comprising:
computing a block index value as remaining components corresponding to said first look-up unit.

6. The method as described in claim 1 further comprising:
resolving coherency problems associated with a processor and a memory component.

7. A computer system for upgrading an entry, said computer system comprising:
    a first look-up unit for supporting an aligned range and having a first granularity and a first clustering level;
    a second look-up unit for supporting an aligned range and having a second granularity equal to the first granularity plus the first clustering level less an offset; and
    a processor configured to execute instructions for upgrading an entry, said instructions comprising:
        instructions to determine whether entries of said first look-up unit are safe, wherein said entries comprise high order bits corresponding to a number of bits of an address less said first clustering level less said first granularity, and wherein said entries comprise low order bits corresponding to said first clustering level;
        provided entries of said first look-up unit are safe, instructions to create a new entry in said second look-up unit, wherein said new entry comprises entries with high order bits corresponding to the number of bits of said address less said second clustering level less said second granularity, and wherein said new entry comprises entries with low order bits corresponding to said second clustering level; and
        instructions to set entries of a block within said second look-up unit safe, wherein said block comprises high order bits corresponding to said first granularity and said first clustering level less said second granularity.

8. A computer system as described in claim 7, wherein said instructions further comprise:
instructions to remove said entries of said first look-up unit.

9. A computer system as described in claim 7, wherein said instructions further comprise:
instructions to determine whether said second look-up unit contains free entries.

10. A computer system as described in claim 7, wherein said instructions further comprise:
instructions to terminate creating incident to said instructions to create and terminate setting incident to said instructions to set when said second look-up unit contains no free entries.

11. A computer system as described in claim 7, wherein said instructions further comprise:
instructions to compute a block index value as remaining components corresponding to said first look-up unit.

12. A computer system as described in claim 7 further comprising:
a memory component for storing information.

13. A computer system as described in claim 7, wherein said processor is operable to resolve coherency problems between said processor and a memory component.

14. A computer-readable medium having stored thereon, computer executable instructions that, if executed by a device, cause the device to perform a method comprising:
    determining whether entries of a first look-up unit are safe, wherein said entries comprise high order bits corresponding to a number of bits of an address less a first clustering level less a first granularity, and wherein said entries comprise low order bits corresponding to said first clustering level;
    provided entries of said first look-up unit are safe, creating a new entry in a second look-up unit, wherein said new entry comprises entries with high order bits corresponding to the number of bits of said address less a second clustering level less a second granularity, and wherein said new entry comprises entries with low order bits corresponding to said second clustering level; and
    setting entries of a block within said second look-up unit safe, wherein said block comprises high order bits corresponding to said first granularity and said first clustering level less said second granularity.

15. The computer-readable medium as described in claim 14 where said method further comprises:
removing said entries of said first look-up unit.

16. The computer-readable medium as described in claim 14 where said method further comprises:

determining whether said second look-up unit contains free entries.

17. The computer-readable medium as described in claim 14 where said method further comprises:

terminating said creating and terminating said setting when said second look-up unit contains no free entries.

18. The computer-readable medium as described in claim 14 where said method further comprises:

computing a block index value as remaining components corresponding to said first look-up unit.

19. The computer-readable medium as described in claim 14 where said method further comprises:

resolving coherency problems associated with a processor and a memory component.

20. An computer system comprising:

means for determining whether entries of a first look-up unit are safe, wherein said entries comprise high order bits corresponding to a number of bits of an address less a first clustering level less a first granularity, and wherein said entries comprise low order bits corresponding to said first clustering level;

means for creating a new entry in a second look-up unit provided entries of said first look-up unit are safe, wherein said new entry comprises entries with high order bits corresponding to the number of bits of said address less a second clustering level less a second granularity, and wherein said new entry comprises entries with low order bits corresponding to said second clustering level; and means for setting entries of a block within said second look-up unit safe, wherein said block comprises high order bits corresponding to said first granularity and said first clustering level less said second granularity.

21. The computer system as described in claim 20 further comprising:

means for removing said entries of said first look-up unit.

22. The computer system as described in claim 20 further comprising:

means for determining whether said second look-up unit contains free entries.

23. The computer system as described in claim 20 further comprising:

means for terminating said creating and terminating said setting when said second look-up unit contains no free entries.

24. The computer system as described in claim 20 further comprising:

means for computing a block index value as remaining components corresponding to said first look-up unit.

25. The computer system as described in claim 20 further comprising:

means for resolving coherency problems associated with a processor and a memory component.

\* \* \* \* \*